US012248398B2

(12) United States Patent
Esun

(10) Patent No.: US 12,248,398 B2
(45) Date of Patent: Mar. 11, 2025

(54) SERVICE WORKER FOR VERSION MANAGEMENT

(71) Applicant: Stripe, Inc., South San Francisco, CA (US)

(72) Inventor: Miguel Jimenez Esun, Madrid (ES)

(73) Assignee: Stripe, Inc., South San Francisco, CA (US)

( * ) Notice: Subject to any disclaimer, the term of this patent is extended or adjusted under 35 U.S.C. 154(b) by 68 days.

(21) Appl. No.: 17/988,223

(22) Filed: Nov. 16, 2022

(65) Prior Publication Data

US 2024/0160569 A1    May 16, 2024

(51) Int. Cl.
  *G06F 12/0802*    (2016.01)
  *G06F 16/957*    (2019.01)

(52) U.S. Cl.
  CPC ...... *G06F 12/0802* (2013.01); *G06F 16/9574* (2019.01); *G06F 2212/60* (2013.01)

(58) Field of Classification Search
  None
  See application file for complete search history.

(56) References Cited

U.S. PATENT DOCUMENTS

| 9,639,629 | B1* | 5/2017 | Venkat | G06F 16/80 |
| 2002/0056100 | A1* | 5/2002 | Shimomura | H04N 21/235 |
| | | | | 348/E7.071 |
| 2012/0260157 | A1* | 10/2012 | Zhu | G06F 16/9574 |
| | | | | 709/213 |
| 2017/0300183 | A1* | 10/2017 | Barrus | G06F 3/0482 |

FOREIGN PATENT DOCUMENTS

CN    106599146 B  *  5/2021  ......... G06F 16/9574

* cited by examiner

*Primary Examiner* — Hosain T Alam
*Assistant Examiner* — Anthony G Gemignani
(74) *Attorney, Agent, or Firm* — Foley & Lardner LLP

(57) ABSTRACT

In an example embodiment, a solution is provided that balances between speed of access and capabilities of an accessed file. More specifically, the concept of a service worker is introduced. The service worker has the ability to intercept requests, such as HTTP requests, for file and to modify them, if necessary. By acting as a middleman between the web browser instance and the web server, the service worker is able to elect to choose to either request versions of files in the cache or to allow the older versions of the files in the cache to remain and be used, balancing between the need for timely responses to requests for files and the need to have updated versions of the files be used. It can then modify web requests from the web browser (such as from web workers of a browser context) as needed to accomplish the aforementioned balance.

15 Claims, 12 Drawing Sheets

SERVICE WORKER FOR VERSION MANAGEMENT

TECHNICAL FIELD

The subject matter disclosed herein generally relates to world wide web (WWW) interfaces. More particularly, the subject matter disclosed herein relates to a service worker for version management.

BACKGROUND

The world wide web (WWW), commonly known as the web, is an information system enabling documents and other web resources to be accessed over the Internet. Web interfaces are used to allow client-side devices, such as desktop computers, laptop computers, smartphones, and tablets, to access WWW pages and other resources. Typically, these web interfaces are implemented as web browsers, which retrieve files from a web server and then graphically render the page on the user's screen. Modern web browsers allow for multiple tabs to be rendered within a single web browser instance, with each tab rendering a different web page.

It is not uncommon for a user to have multiple tabs open simultaneously, some of which may access the same resource or data. For example, a user may visit the web page of an online retailer in one tab, then later open a second tab to that same retailer and add a product for purchase to an online shopping cart in the second tab. The added product, however, does not get automatically reflected in the shopping cart in the first tab, potentially causing confusion.

BRIEF DESCRIPTION OF THE DRAWINGS

Some embodiments are illustrated by way of example and not limitation in the figures of the accompanying drawings.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Figure 1:
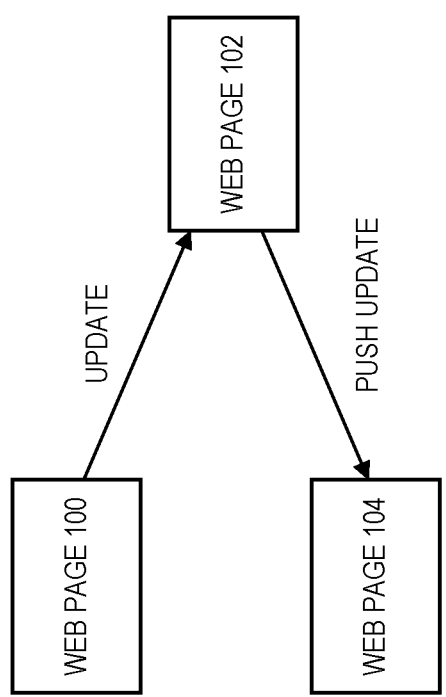
FIG. 1 is a block diagram illustrating such a server-based synchronization system.

One way to synchronize the data between multiple tabs of a web browser is to have the user interface associated with each of the tabs communicate changes of data to a server. The server then pushes updates to the user interface associated with any tab that is relying on that data, informing it of the change. FIG. 1 is a block diagram illustrating such a server-based synchronization system. Here, web page 100 performs an update to some piece of data (such as a shopping cart update), which is then communicated with web server 102. Web server 102 knows that web page 104 also relies upon that same piece of data (such as by the fact that web page 104 had previously requested the same piece of data from web server 102), and generates a push update to web page 104 informing web page 104 of the change that web page 100 made to the piece of data.

A technical issue, however, is encountered in using such a solution. Specifically, there is a time lag between when the user makes the update to the piece of data in web page 100 and when that change is recognized in the web server 102 and then ultimately pushed to and processed by the web page 104. During this time lag, the piece of data is essentially left unsynchronized between web page 100 and web page 104, allowing for the same types of technical problems as if no synchronization was provided. What is needed is a solution that identifies data that is used in multiple tabs of a web browser and synchronizes the data between those multiple tabs.

In an example embodiment, a shared worker object is used in a web browser to synchronize data across tabs in the web browser, without relying upon a web server to perform or coordinate that synchronization. More particularly, each browsing context includes a web page and zero or more web worker objects, each web worker object corresponding to a different module of the web page. The zero or more web worker objects in each web page user interface may then be configured to communicate with a single shared worker, through which all data requests and data changes are sent. The single shared worker can communicate with any/all the browsing contexts having a web page that share the same origin. In other words, there is one shared worker per origin. The single shared worker forwards data requests and data changes to the web server, but also tracks such data requests and then automatically updates any browsing context that requested a particular piece of data in the past with a change that occurred to that particular piece of data.

In an example embodiment, the "origin" of a web page within a browsing context is a combination of protocol used to access the web page, domain of the web page, and port used to access the web page. As such, for example, web page A and web page B may share the same origin if they share the same domain, and the web browser is using the same protocol and port to access both web page A and web page B. If web page A is in one domain, however, and web page B is in another domain, then they do not share an origin and thus would not have a shared worker shared between them. The same outcome would occur if web pages A and B are in the same domain, but the web browser is using different ports to access each. Notably, it is even possible for duplicates of the exact same web page to not share the same origin, if the browser uses different ports and/or protocols. For example, web page A and a duplicate of web page A at the same address would share the same domain, but the web browser could access web page A using a different port than it uses to access the duplicate of web page A, which would result in them having separate origins.

Figure 2:
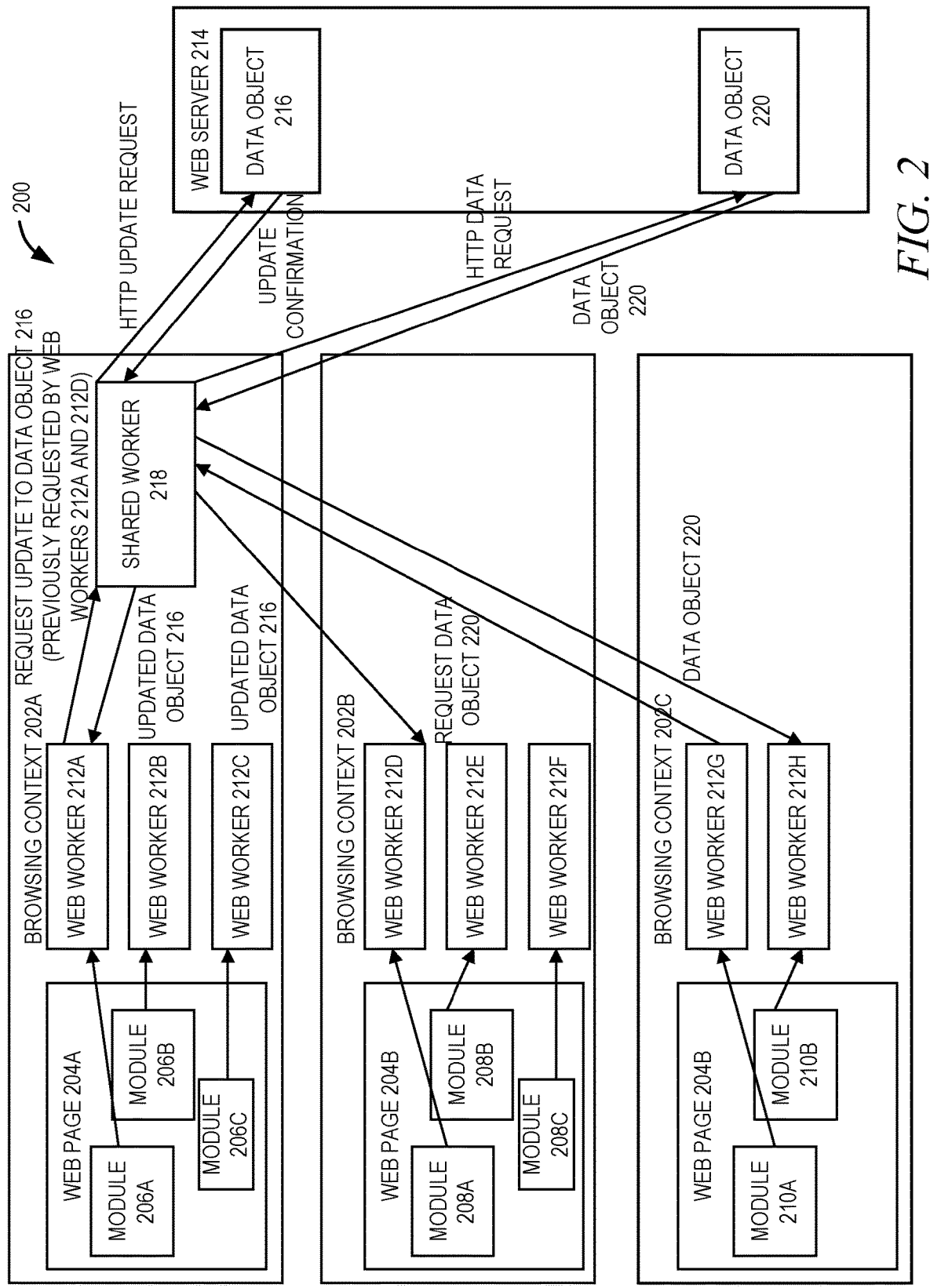
FIG. 2 is a block diagram illustrating a web-based system, in accordance with an example embodiment.

FIG. 2 is a block diagram illustrating a web-based system 200, in accordance with an example embodiment. Here, the web-based system 200 includes a plurality of browsing contexts 202A, 202B, 202C. Here each of the browsing contexts 202A, 202B, 202C corresponds to a different tab of a web browser, or a different window of the web browser, or even a different instance of the web browser, or similar functionality in which web browser may operate multiple web pages simultaneously. Notably, however, they all must be part of the same web browser in order to share a shared worker—browsing contexts in different web browsers do not share shared workers.

Each browsing context 202A, 202B, 202C includes a web page 204A, 204B, 204C. In an example embodiment, web pages 204A and 204B are duplicates of each other, but this is not strictly relevant as long as the web pages share the same origin and both access the same data object.

Each web page 204A, 204B, 204C may comprise one or more modules. For example, web page 204A contains modules 206A, 206B, and 206C, web page 204B contains modules 208A, 208B, and 208C. Web page 204C contains modules 210A and 210B. Each module 206A, 206B, 206C, 208A, 208B, 208C, 210A, and 210B has a corresponding web worker 212A-212H that renders the corresponding module 206A, 206B, 206C, 208A, 208B, 208C, 210A, and 210B in the web browser and handles interactions between the corresponding module 206A, 206B, 206C, 208A, 208B, 208C, 210A, and 210B and other modules, as well as with web server 214. Web server 214 maintains data objects that may be either accessed by or updated by any of the web workers 212A-212H. When a web worker, such as web worker 212A or web worker 212D, requests data from a particular data object 216 on the web server 214, this request is first sent through shared worker 218. Notably, shared worker 218 is shared among all of the browsing contexts 202A, 202B, 202C depicted here because, all share the same origin. If one of these browsing contexts, for example browsing context 202C, did not share the same origin as the other browsing contexts 202A, 202B, then browsing context 202C would have had its own shared worker.

Requests for data objects received by the shared worker 218 are registered. Thus, the shared worker 218 keeps track of the fact that both web worker 212A and web worker 212D requested data from data object 216. Likewise, if web worker 212G requested data from data object 220, the shared worker 218 would keep track of that fact as well.

When a web worker, such as web worker 212A then performs an update to data object 216, the shared worker 218 sends this update to the web server 214, which updates the data object 216 and sends a confirmation to the shared worker 218. The shared worker 218 then updates any active web worker that previously requested data from the same data object 216. Since the shared worker 218 registered these requests, it has access to this information. As such, in this case, since the shared worker 218 knows that web workers 212A and 212D previously requested data from data object 216, and both these web workers 212A and 212D are still active (e.g., their corresponding browsing contexts 202A, 202B have not been closed), then the shared worker 218 sends the update to both web workers 212A and 212D. Web workers 212A and 212D can then update their corresponding modules 206A, 208A with the updated information.

Notably, the fact that web worker 212G made a data request as well is not relevant to the shared workers 218 response to the data requests from web workers 212A and 212D, because web worker 212G was requesting a different data object (data object 220 instead of data object 216).

In an example embodiment, the shared worker 218 communicates with the web server 212 via the Hypertext Transmission Protocol (HTTP). It should be noted that HTTP is merely one example of a communication protocol that can be used. Another could be Web Sockets. Each web worker 212A-212H may update its corresponding module 206A, 206B, 206C, 208A, 208B, 208C, 210A, and 210B by rendering the corresponding session and issuing any necessary document object model (DOM) changes to a user interface thread, via a post message. Use of a web worker also ensures that a proper cleanup can be performed when a view gets unloaded, by terminating the web worker instance, thus keeping system memory consumption under control.

In an example embodiment, the shared worker 218 can also be used to eliminate duplicate simultaneous requests for the same data from different web workers. Here, since the shared worker 218 is tracking requests for data objects by browsing contexts, it can check to see if a request for a particular data object would be fulfilled by a request for that same data object (or a data object containing that same data object) made earlier by another web worker and that has not yet been fulfilled by the web server 212.

Figure 3:
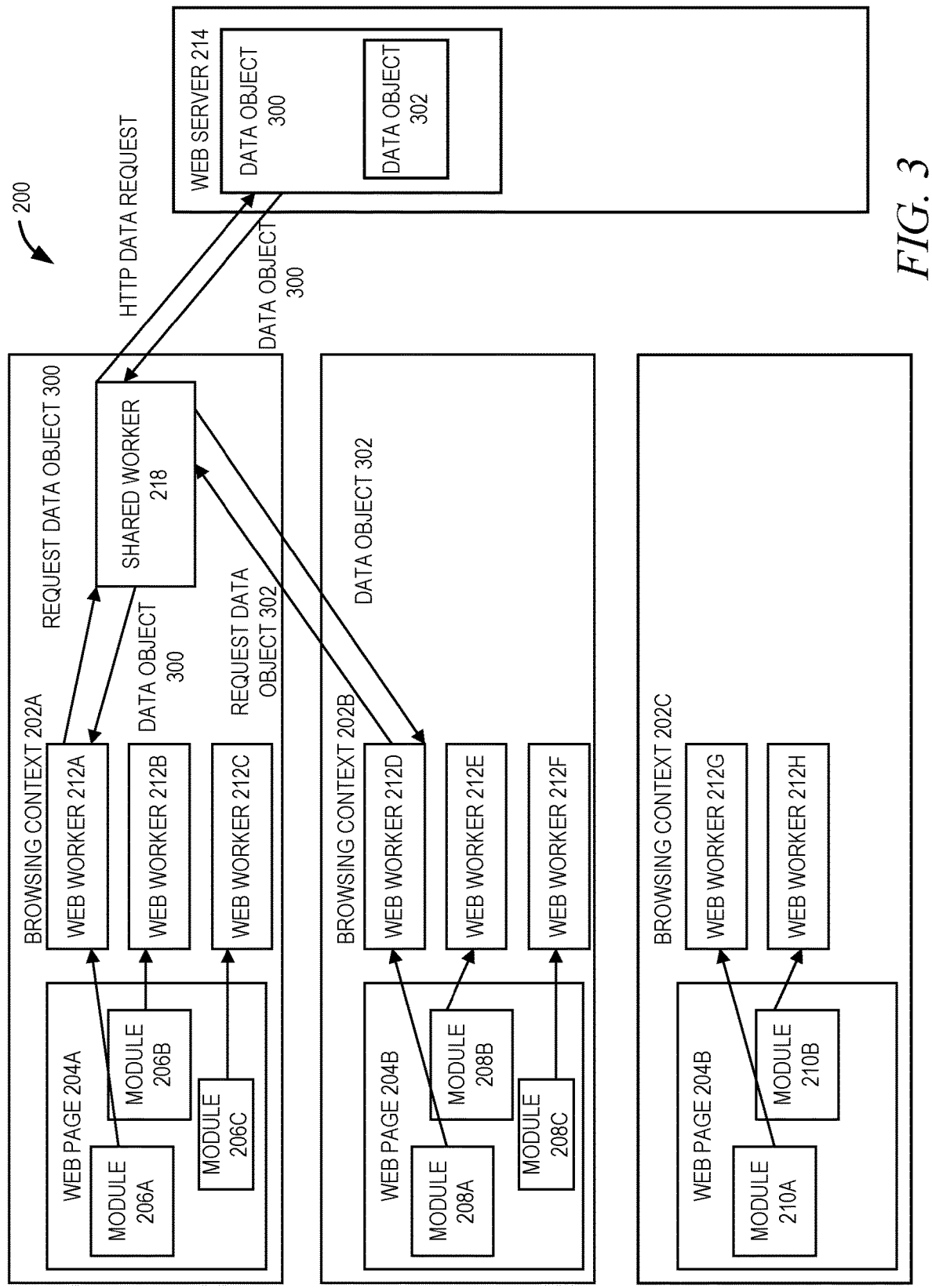
FIG. 3 is a block diagram illustrating deduplicating redundant requests in web-based system, in accordance with an example embodiment.

FIG. 3 is a block diagram illustrating deduplicating redundant requests in web-based system 200, in accordance with an example embodiment. Here, for example, web worker 212A requests data object 300, which causes shared worker 218 to register this request and send the request via HTTP to web server 214. While waiting on a response to this HTTP request, shared worker 218 receives a request for data object 302 from web worker 212D, where data object 302 is a subset of data object 300. The shared worker 218, recognizing that the earlier request will satisfy this new request, simply registers the request from web worker, but does not generate its own HTTP request to the web server 212. When the HTTP response, which includes data object 300 (and thus also includes data object 302) is received by the shared worker 218, the shared worker 218 returns data object 300 to web worker 212A and data object 302 to web worker 212D.

Figure 4:
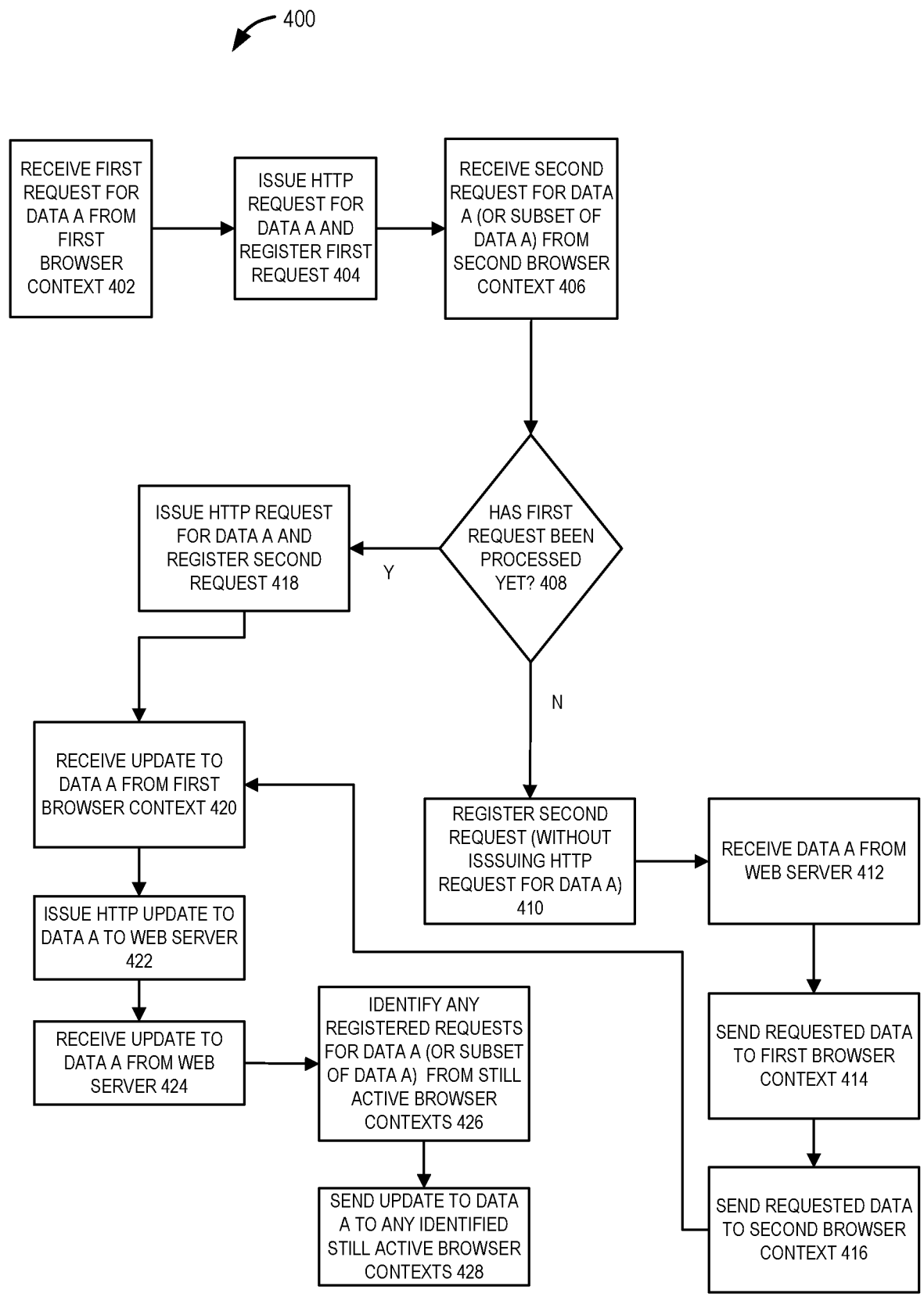
FIG. 4 is a flow diagram illustrating a method for managing a shared worker in a browser context, in accordance with an example embodiment.

FIG. 4 is a flow diagram illustrating a method 400 for managing a shared worker in a browser context, in accordance with an example embodiment. At operation 402, a first request for data A is received from a first browser context. At operation 404, the shared worker issues an HTTP request for data A and registers the first request. At operation 406, a second request for data A, or a subset of data A, is received from a second browser context.

At operation 408, it is determined if the first request has been processed yet. If not, then at operation 410 the second request is registered, without issuing an HTTP request for data A. At operation 412, data A is received from the web server. Then at operation 414, the requested data is sent to the first browser context. At operation 416, the requested data is sent to the second browser context. The method 400 then proceeds to operation 420, which will be described later.

If at operation 408 it is determined that the first request has been processed yet, then at operation 418, an HTTP request is issued for data A and the second request is registered. At operation 420, an update is received to data A from the first browser context. Then, at operation 422, an HTTP update to data A is issued to the web server. At operation 424, an update to data A is received from the web server. At operation 426, any registered requests for data A (or a subset of data A) from still active browser contexts are identified. At operation 428, the update to data A is sent to any identified still active browser contexts.

Another technical issue that may be encountered is that there are certain web pages that are updated quite frequently. Specifically, in some industries, software lifecycle is delivered in the form of continuous integration and continuous deployment. In practice what that means is that a software designer may be releasing small changes quite frequently, such as multiple times per hour at peak time, rather than saving up the small changes for one large bulk update performed less frequently.

Serving web applications is performed by building files in a single file (a bundle) and naming it with some hash based on its contents. The hashed files may then be deployed and then stored in local caches. If something in a file gets changed, even something minor, then the hash of the new version is completely different than the hash of the old version, and the old version in the cache gets invalidated. More particularly, a local client checks to see whether the file in its local cache matches the one required by the web page by checking its file name. If it does not, the local client requests the newest version from the web server.

The problem is that requesting and receiving a new version of a file can be slow. In cases where the file is updated daily or even hourly, the result is that nearly every time a user wishes to utilize or access the file, the process of utilization or accessing of the file is delayed. In other words, the user experiences a noticeable delay, not just sometimes, but nearly all the time.

In an example embodiment, a solution is provided that balances between speed of access and capabilities of the accessed file. More specifically, a service worker is used. A service worker is a program that is installed in a browser context the first time a page is visited, and manages the local cache for the files that make up the web page.

All traffic in the browser context is passed through the service worker. The service worker has the ability to intercept requests, such as HTTP requests, for file and to modify them, if necessary. By acting as a middleman between the web browser instance and the web server, the service worker is able to elect to choose to either request versions of files in the cache or to allow the older versions of the files in the cache to remain and be used, balancing between the need for timely responses to requests for files and the need to have updated versions of the files be used. It can then modify web requests from the web browser (such as from web workers or a browser context) as needed to accomplish the aforementioned balance.

Figure 5:
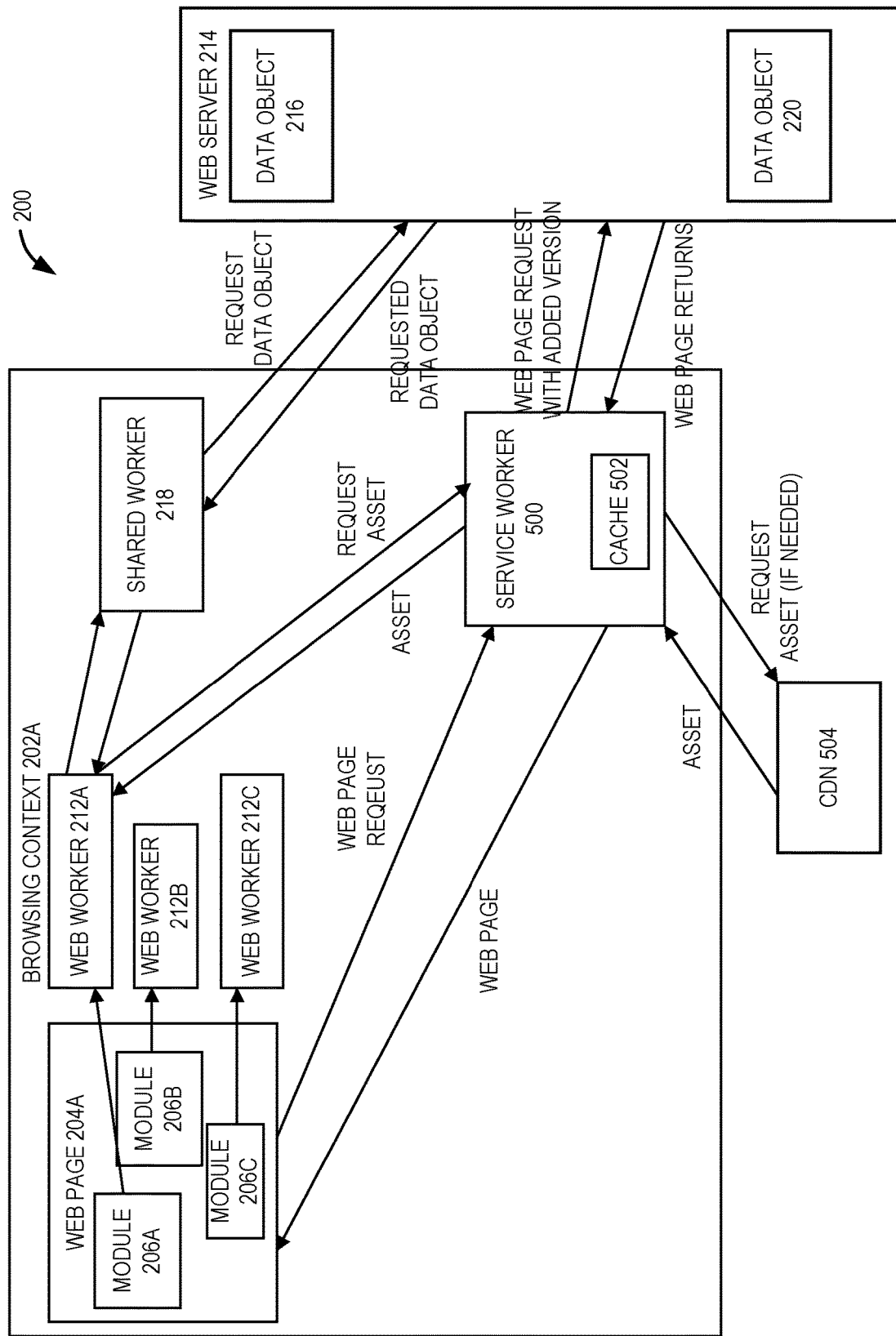
FIG. 5 is a block diagram illustrating a web-based system including a service worker 500, in accordance with an example embodiment.

FIG. 5 is a block diagram illustrating a web-based system 200 including a service worker 500, in accordance with an example embodiment. As with in FIG. 2, the web-based system 200 includes a plurality of browsing contexts, although for brevity here only browsing context 202A is depicted.

The browsing context 202A includes a web page 204A. Web page 204A, 204B may comprise one or more modules. For example, web page 204A contains modules 206A, 206B, and 206C. Each module 206A, 206B, 206C has a corresponding web worker 212A-212C that renders the corresponding module 206A, 206B, 206C in the web browser and handles interactions between the corresponding module 206A, 206B, 206C and other modules, as well as with web server 214. Web server 214 maintains data objects that may be either accessed by or updated by any of the web workers 212A-212C.

Prior to the web workers 212A, 212B, 212C being initialized, a service worker 500 may be utilized to optimize delivery of assets related to the modules 206A-206C.

More particularly, service worker 500 maintains a cache 502 that may or may not contain assets referenced by the web page 204A, and those assets may include assets pertaining to the web workers 212A-212C and needed to initialize those web workers 212A-212C. The assets in the cache also may or may not be out of date.

In contrast to, for example, requesting the latest version of all requested assets (which adds delay to servicing the web pages requests) or to blindly using any requested assets that are already in the cache (which can lead to incompatible or otherwise significantly outdated data objects being returned), the service worker 500 sends the version identification of the any requested assets that are in the cache to the web server 214. The web server 214 then checks to see if the version identification is still valid. Notably, this is different than checking to see if the version identification corresponds with the latest version. For example, the version of an asset in the cache 502 may be version 2.2, and web server may have version 2.4 of the web page in its own storage, but as long as version 2.2 is still considered valid by the web server 214, then the aforementioned check is determined to have an output of "yes", the version identification (2.2) is still valid. The web server 214 returns whatever version of the web page it feels is appropriate given this check, and this web page represents web page 204A in the figure. When the browsing context 202A goes to run this web page, the request for the assets referenced in this web page (which may include, as stated before, the assets for web worker s 212A-212C), is intercepted by the service worker 500 and returned from the cache 502 whenever present, or requested from the CDN 404 when not. The assets are then returned.

Validity of a version may be determined in a number of different ways. In one example embodiment, a table is maintained at the web server 214 of valid and/or invalid versions. Web page designers may update this table with validity or invalidity information, or inform the web server 214 of the changes so that the web server 214 updates this table. Invalidity may be indicated, for example, when a web designer determines that there is a bug or other critical error in the version.

In another example embodiment, validity may be determined based on a time-based formula. For example, there may be a static offset indicating when a version is too old (e.g., one week), and any versions with identifications whose ages are more than the threshold (e.g., older than a week) are considered invalid, while identifications whose ages are less than the threshold (e.g., newer than a week) are valid.

The determination of whether a version is valid or not can also be determined by a more complex mechanism. For example, it may be determined dynamically based on some level of personalization factors, such as determined on a user-by-user level based on whether the user is a type of user where speed is of the essence or whether the user would prefer more frequently updated data objects. Indeed, the service worker 500 can actually determine the network speed of the user, and if it determines that the network speed is so fast that the additional delay in requesting a newest version each time is negligible, then the entire cache can be bypassed each time (essentially behaving as if the service worker 500 did not exist, or if every older version were invalid).

It should be noted that while FIG. 5 depicts the use of both a service worker 500 and the shared worker 218 together, in an example embodiment, the service worker 500, and all the functionality of the service worker described herein, may be utilized without using a shared worker 218 at all, or even web workers 212A-212C. Indeed, the service worker 500 may operate a stand-alone functionality from that described above with respect to shared workers 218 and web workers 212A-212C.

Figure 6:
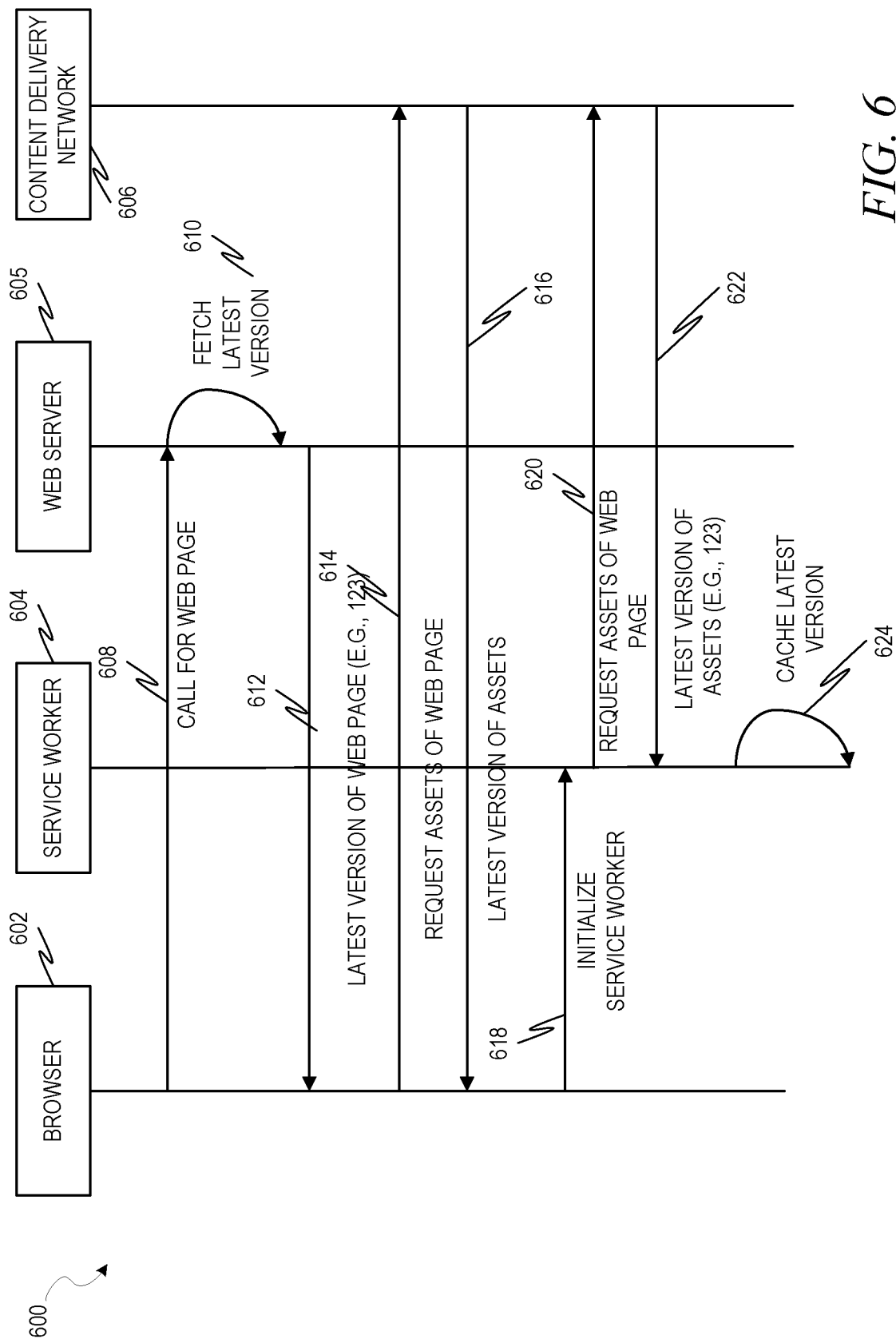
FIG. 6 is a ladder diagram illustrating a method of setting up a service worker to optimize asset load, in accordance with an example embodiment.

FIG. 6 is a ladder diagram illustrating a method 600 of setting up a service worker top optimize asset load, in accordance with an example embodiment. The method 600 utilizes a browser 602, service worker 604, web server 605 and content delivery network 606. At the beginning of the method 600 the service worker 604 has not been initialized yet. As such, when browser 602 needs a web page, at operation 608 the call is made for the web page at the web server 605. At operation 610, the web server 605 fetches the latest version of the web page from its own storage. Then, at operation 612, the web server 605 returns the latest version of the web page, which includes references to the latest versions of assets (e.g., version 123 of web page references version 123 of asset A). At operation 614, the browser 602 runs the web page, which causes the related assets to be requested from content delivery network 606. At operation 616, the content delivery network 606 returns the latest version of the web page, including the latest version of the related assets (e.g., version 123). At operation 618, the browser 602 initializes the service worker 500. Then, at operation 620, the service worker 604 requests the related assets again, obtaining the latest version of the assets at operation 622. This may occur when the service worker 500 determines that the network is idling, so that it does not affect other data operations. The latest version of the assets, such as version 123 of asset A, are then cached at operation 624.

Figure 7:
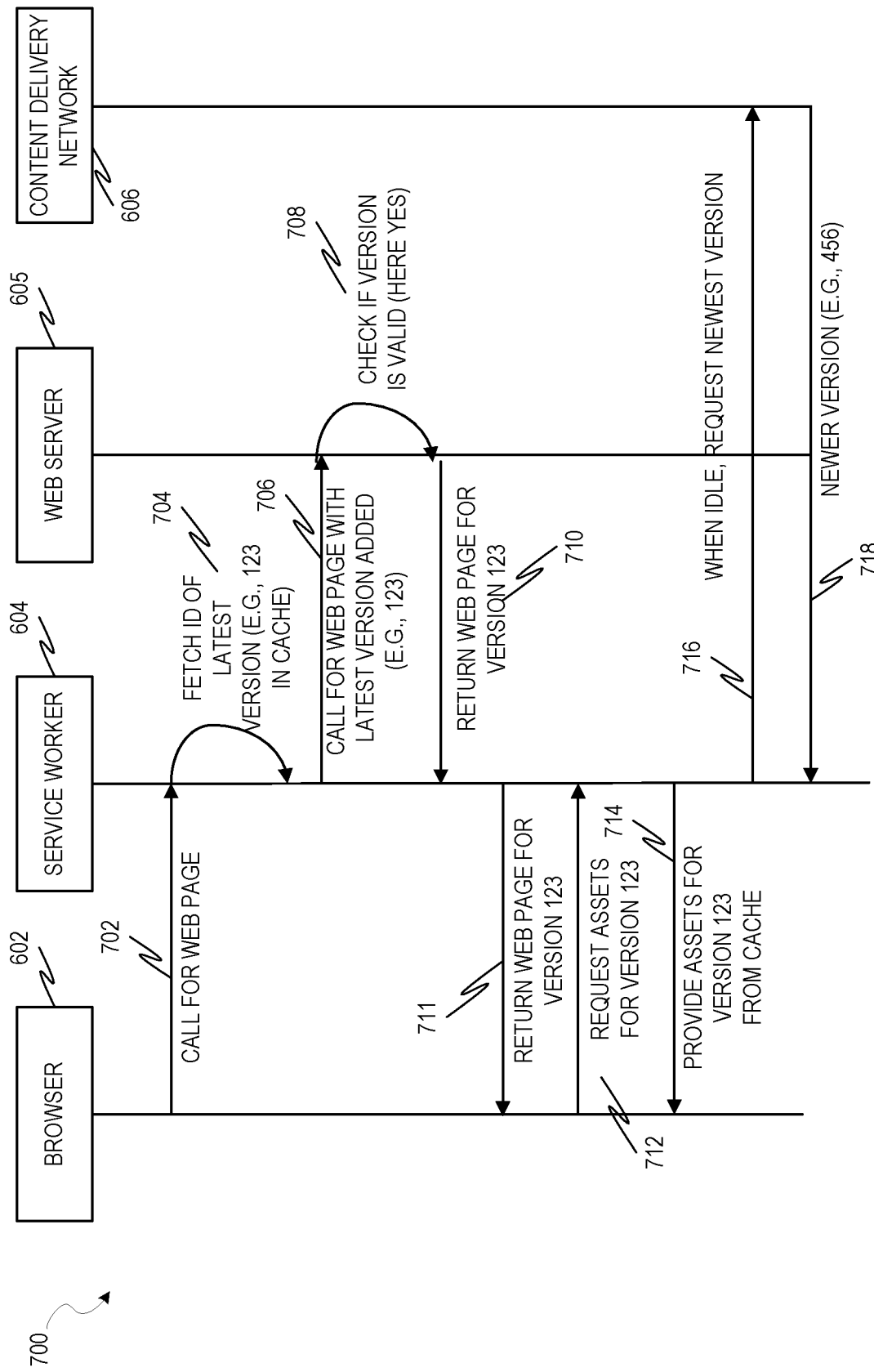
FIG. 7 is a ladder diagram illustrating a method of using an established service worker to update assets, in accordance with an example embodiment.

FIG. 7 is a ladder diagram illustrating a method 700 of using an established service worker 604 to update assets, in accordance with an example embodiment. The method 700 utilizes the browser 602, service worker 604, web server 605 and content delivery network 606 of FIG. 6, although now the service worker 604 has been initialized and contains a cache with versions of data objects in it.

At operation 702, the browser 602 initiates a call for a web page. This call is intercepted by service worker 604, and at operation 704, the service worker 604 fetches the identification(s) of a latest version of related assets in the cache. Since, as an example in FIG. 6, version 123 of asset A was described as having been stored in the cache, in this example version 123 of asset A is what is fetched in operation 704. At operation 706, the service worker 604 makes a call for the web page with a parameter added. The parameter is the identification of the latest version of the data object in the cache (e.g., version 123). The parameter may be added in the form of a query parameter (after a ? sign in the URL sent to the server), as an HTTP header, or via any other method.

At operation 708, the web server 605 checks to see if the version identification included as a parameter in the call is valid. FIG. 7 depicts a case where this check returns "yes" (i.e., the version identification included as a parameter in the call is valid), despite the fact that there is indeed a newer version of data object A at content delivery network 606 (e.g., version 456). At operation 710, the web server 605 returns the web page continuing references to the valid "old" asset version (version 123) to the service worker 604, which then returns it to the browser 602 at operation 711.

At operation 712, the browser 602 requests the assets for version 123 since it is running the web page. This request again is intercepted by service worker 604, and since it can be served using the version in the cache, the assets are provided from the cache at operation 714. Later, when idle, at operation 716, the service worker 604 can request the newest version (e.g., version 456) of the assets from the content delivery network 606, which are returned at operation 718 so it can be stored in the cache. In this manner, the service worker 604 can periodically update the assets in the cache without impacting individual calls from the browser 602.

Figure 8:
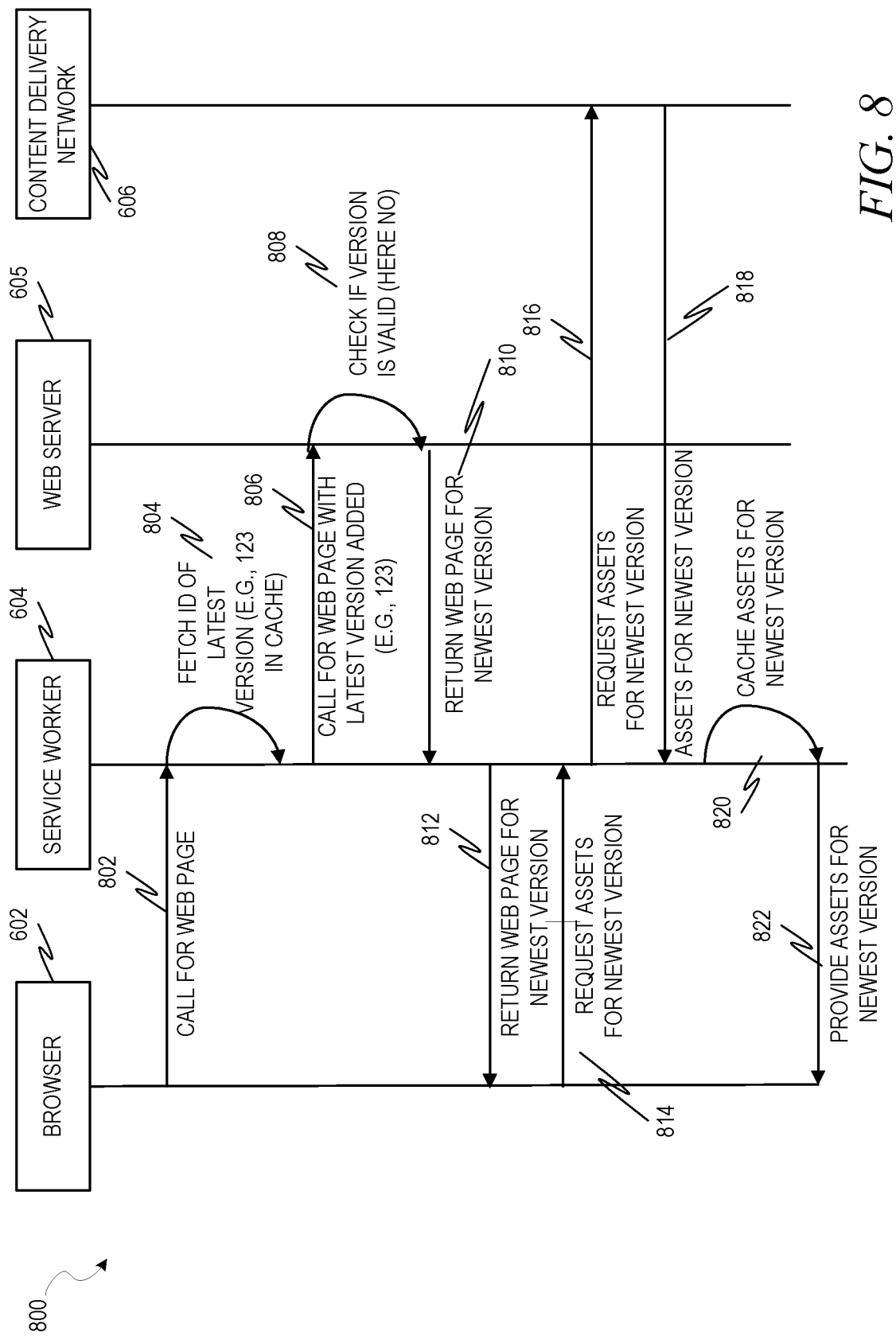
FIG. 8 is a ladder diagram illustrating a method of using an established service worker, in accordance with an example embodiment.

FIG. 8 is a ladder diagram illustrating a method 800 of using an established service worker 604, in accordance with an example embodiment. The method 800 utilizes the browser 602, service worker 604, web server 605 and content delivery network 606 of FIG. 6, although now the service worker 604 has been initialized and contains a cache with versions of data objects in it.

At operation 802, the browser 602 initiates a call for a web page. This call is intercepted by service worker 604, and at operation 804, the service worker 604 fetches the identification(s) of a latest version of related data objects in the cache. Since, as an example in FIG. 6, version 123 of asset A was described as having been stored in the cache, in this example version 123 of asset A is what is fetched in operation 804. At operation 806, the service worker 604 makes a call for the web page with a parameter added. The parameter is the identification of the latest version of the assets in the cache.

At operation 808, the web server 605 checks to see if the version identification included as a parameter in the call is valid. FIG. 8 depicts a case where this check returns "no" (i.e., the version identification included as a parameter in the call is invalid). At operation 810, the web server 605 returns the web page containing references to the newest version asset (version 456) to the service worker 604, which then returns it to the browser 602 at operation 812.

At operation 814, the browser 602 runs the newest version of the web page and requests assets for the newest version. This request again is intercepted by service worker 604, and since it cannot be served using the version in the cache, the assets are requested using the script from the content delivery network 606 at operation 816. At operation 818, the content delivery network 606 sends the latest version of the assets, and at operation 820 these assets are cached in the cache. The latest version of the assets are then provided to the browser 602 at operation 822.

In another example embodiment, an edge differ is introduced. At some point, file bundles become invalid, but that does not mean that all files in the bundle are invalid. Specifically, files on the web server may be grouped as bundles and treated as bundles for versioning purposes, but this means that when one file in the bundle is invalid, the entire bundle needs to be redownloaded when it is requested. Thus if, for example, there are 100 files in a bundle, and this bundle is stored in a cache at the service worker, and then one of the files in the bundle is indicated as invalid (for example, if a bug is detected in it), then when a request is made for the corresponding web page, rather than get the 99 valid files from the cache and merely request the 1 invalid file from the web server, the service worker winds up needing to request the entire new bundle, with all 100 files, from the web server, which adds delay.

An edge differ is a program that lives on the network edge and performs a differ operation on a requested bundle to determine the difference between the invalid version of the bundle and the newest version of the bundle, on a file-by-file basis. Essentially, the edge differ finds files that differ from one bundle (or bundle version) to another. Here, the edge of the network can actually be in one of many locations. For example, it may be located on the web server, or the content delivery network, or somewhere in between.

Thus, for example, the edge differ might receive an indication from the service worker 500 indicating that the last version the service worker 500 has in the cache 502 is version 123, and it might compare the bundle for version 123 to the bundle for version 456 (its latest known version), determining which individual files within the bundle have changed. It can then return to the service worker 500 just the individual files within the bundle that have changed, rather than returning the entire version 456 of the bundle.

The edge differ may consume bundles in a particular format that allows it to efficiently diff two versions of the same bundle; for instance, a map where the keys represent the hash oh the file and the values of the JavaScript file.

For example, assume a scenario where there are two bundles, one for a home page and one for a profile page, and these bundles are being regenerated every time any file in the respective bundles is updated. The edge differ then receives an indication that a service worker wants the latest version of the home page, but already has a previous version of the home page. What the edge differ then does is loads both the old version of the home page and the new version of the home page, compares the file contents in each to each other, and removes the ones from the new version of the home page whose hashed file contents match minified file contents of the same keys from the older version of the home page. Keys that are not present in both versions and keys that are present but whose hashed content differs between versions are not removed, and are ultimately served to the service worker.

It should be noted that the edge differ may be applied not just to two different versions of the same bundle, but can be applied to separate bundles who may have overlapping files. Thus, for example, if a user navigates a browser to a home page and then subsequently to a profile page, the edge differ may determine the files that are shared among the home page and the profile page, and then remove the files that are shared and have identical minified content from the profile page bundle that is delivered to the service worker. This eliminates the need for the service worker to download and process files in the profile page that it already has in its cache due to its prior downloading of the home page.

In a further example embodiment, the edge differ is combined with a service worker differ as well. The service worker differ is a program, located at the service worker, that performs a similar difference operation between bundles or bundle versions. This is useful in cases where there is a need to locally compare the files in two bundles because portions of both are stored in the local cache, without needing to make a network call. For example, in the above example where a user navigates a browser to a home page and then subsequently to a profile page, when the content delivery network sends the bundle for the profile page to the service worker, it removes any keys that were present in the home page bundle whose minified contents were identical to the contents of those same keys in the profile page, but it still may convey what the complete bundle should look like. For example, if a particular file YDF wound up being identical (in key and in content) between the home page bundle and the profile page bundle, then file YDF would not be present in the profile page bundle delivered to the service worker but there would be an indication, such as a table of contents or placeholder, that file YDF is part of the profile page bundle. This conveys to the service worker the need to retrieve file YDF from its local cache in order to get the profile page bundle file local rebuilt.

Later, if the user refreshes the profile page or otherwise navigates back to the profile page, then the service worker is starting a new session and tries to load it again from scratch. At this point, the files from the home page bundle are no longer in the browsing context. Rather than refetching the entire profile page bundle from the content delivery network, the service worker can perform a diff operation on the version of the profile page bundle it has in the cache (which is missing the files from the home page bundle) and the version of the profile page bundle that the content delivery network has. It is then able to identify which specific files it does not have, and then can request just a bundle with only those files from the edge differ.

Figure 9:
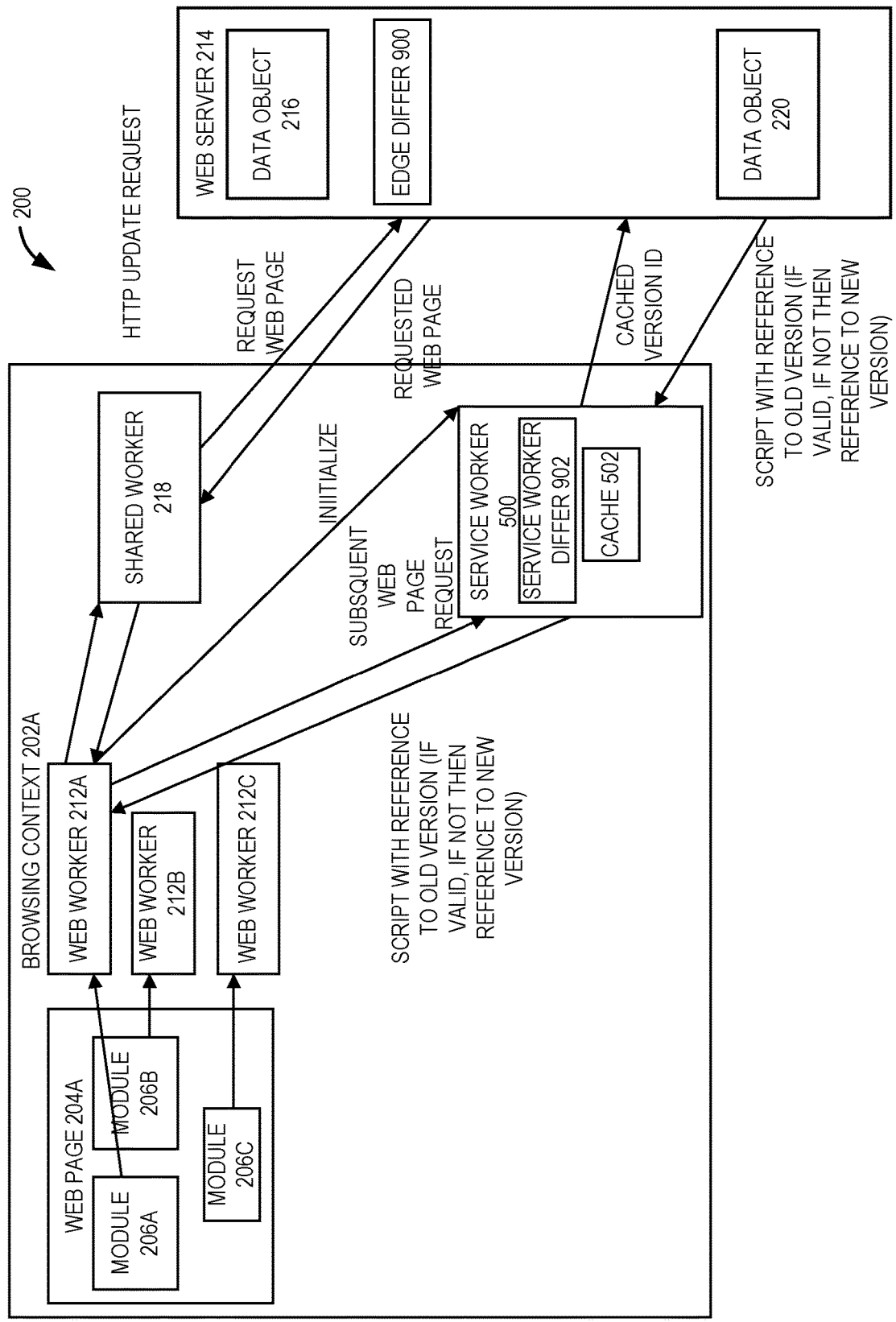
FIG. 9 is a block diagram illustrating a web-based system including a service worker, in accordance with another example embodiment.

FIG. 9 is a block diagram illustrating a web-based system 200 including a service worker 500, in accordance with another example embodiment. Here, an edge differ 900 is depicted on the web server 214 (although as mentioned earlier it may be present on other edge devices instead, such as the content delivery network, not pictured). Additionally, a service worker differ 902 is depicted on the service worker 500.

Figure 10:
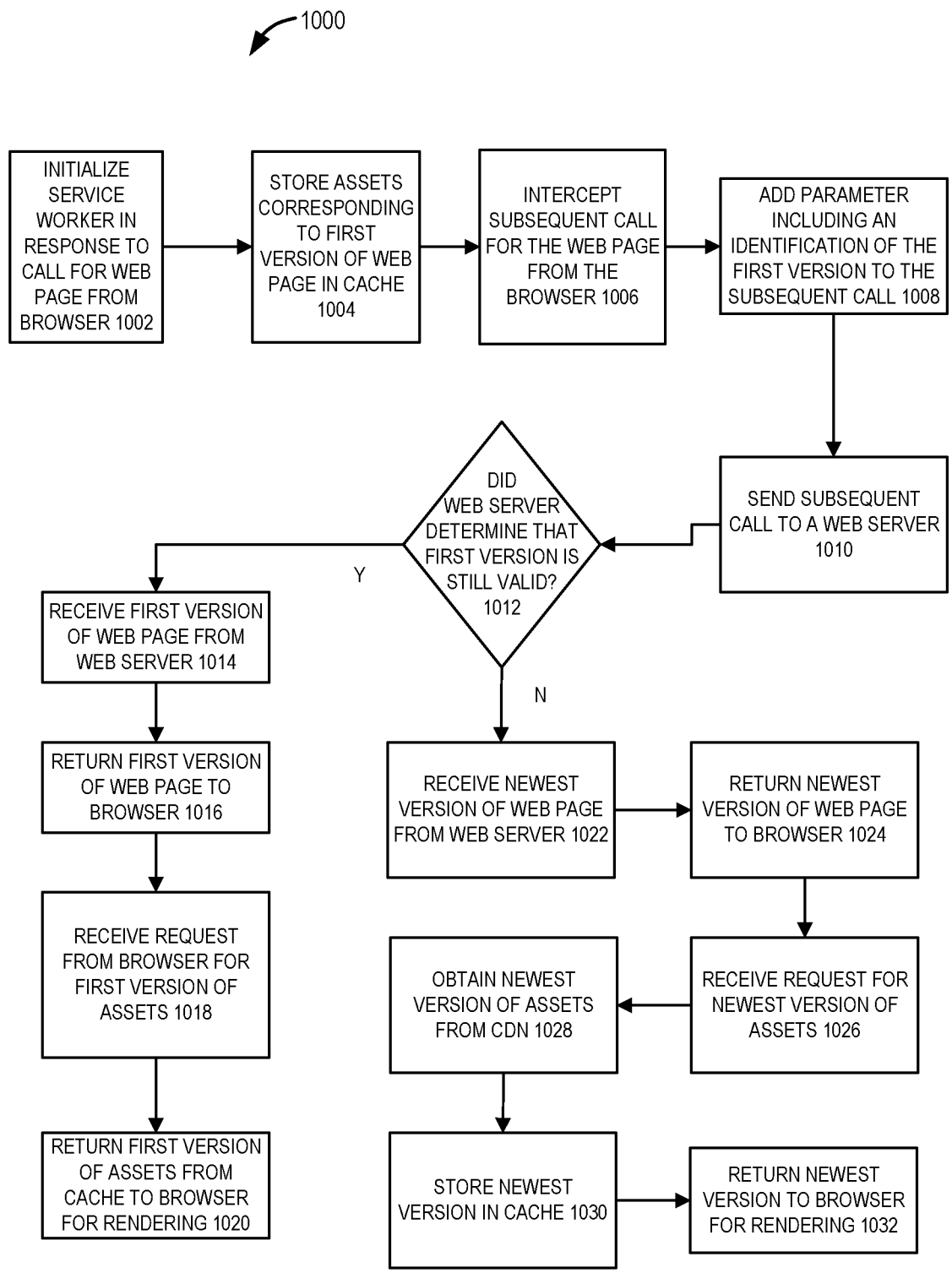
FIG. 10 is a flow diagram illustrating a method for operating a service worker in a browsing context, in accordance with an example embodiment.

FIG. 10 is a flow diagram illustrating a method 1000 for operating a service worker in a browsing context, in accordance with an example embodiment. At operation 1002, a service worker is initialized in response to a call for a web page from a browser. At operation 1004, assets corresponding to a first version of the web page are stored in a cache. At operation 1006, a subsequent call for the web page from the browser is intercepted. At operation 1008, a parameter including an identification of the first version is added to the subsequent call. At operation 1010, the subsequent call is sent to a web server.

At operation 1012, it is determined if the web server determined that the first version is still valid. If so, then at operation 1014, the service worker receives the first version of the web page from the web server. Then, at operation 1016, the service worker returns the first version of the web page to the browser. At operation 1018, the service worker receives a request from the browser for the first version of the assets. At operation 1020, the service worker returns the first version of the assets from the cache to the browser for rendering.

If at operation 1012 it is determined that the web server determined that the first version was not still valid, then at operation 1022, the service worker receives the newest version of the web page from the web server. Then at operation 1024, the service worker returns the newest version of the web page to the browser. At operation 1026, the service worker receives a request from the browser for the newest version of assets related to the web page. At operation 1028, the service worker obtains the newest version of the assets from a content delivery network. At operation 1030, the service worker stores the newest version of the assets in the cache, and then at operation 1032 the service worker returns the newest version of the assets to the browser for rendering.

Described implementations of the subject matter can include one or more features, alone or in combination as illustrated below by way of example.

Example 1. A method comprising:
initializing, at a browsing context corresponding to a web page, a service worker, in response to a call for the web page from a browser;
storing, in a cache at the service worker, assets corresponding to a first version of the web page;
intercepting, at the service worker, a subsequent call for the web page from the browser;
adding, at the service worker, a parameter including an identification of the first version, to the subsequent call;
sending the subsequent call to a web server, the web server configured to perform a check to determine if the first version is still valid;
in response to a determination by the web server that the first version is still valid:
returning the first version of the web page to the browser;
receiving, at the service worker a request from the browser for the assets corresponding to the first version of the web page; and
returning the assets from the cache to the browser for rendering.

Example 2. The method of Example 1, further comprising:
when the service worker is idle, requesting a newest version of the web page from a content delivery network; and
storing assets corresponding to the newest version of the web page in the cache.

Example 3. The method of Example 2, wherein the service worker is idle when it is not active and when it is not waiting on an outstanding request made to the web server or content delivery network.

Example 4. The method of any of Examples 1-3, further comprising:
in response to a determination by the web server that the first version is not still valid:
receiving, from the web server, a newest version of the web page;
returning the newest version of the web page to the browser;
receiving, at the service worker a request from the browser for assets corresponding to the newest version of the web page;
obtaining the assets corresponding to the newest version of the web page from a content delivery network;
storing the assets corresponding to the newest version of the web page in the cache; and
returning the assets corresponding to the newest version of the web page to the browser for rendering.

Example 5. The method of any of Examples 1-4, wherein the web page contains a plurality of components, the browsing context contains a separate web worker for each component, and the call for the web page comes from one of the web workers.

Example 6. The method of Example 4, wherein the newest version of the web page from the content delivery network contains only files that were not already present in the cache by virtue of a diff operation performed by the content delivery network between the first version of the web page and the newest version of the web page.

Example 7. The method of Example 6, wherein the newest version of the web page from the content delivery network contains only files that were not already present in the cache by virtue of a differ operation performed by the content delivery network between the web page and another web page previously loaded into the cache.

Example 8. A system comprising:
one or more processors;
at least one memory storing instructions that, when executed by at least one processor among the one or more processors, cause at least one processor to perform operations comprising:
initializing, at a browsing context corresponding to a web page, a service worker, in response to a call for the web page from a browser;
storing, in a cache at the service worker, assets corresponding to a first version of the web page;
intercepting, at the service worker, a subsequent call for the web page from the browser;
adding, at the service worker, a parameter including an identification of the first version, to the subsequent call;
sending the subsequent call to a web server, the web server configured to perform a check to determine if the first version is still valid;
in response to a determination by the web server that the first version is still valid:
returning the first version of the web page to the browser;
receiving, at the service worker a request from the browser for the assets corresponding to the first version of the web page; and
returning the assets from the cache to the browser for rendering.

Example 9. The system of Example 8, wherein the operations further comprise:
when the service worker is idle, requesting a newest version of the web page from a content delivery network; and
storing assets corresponding to the newest version of the web page in the cache.

Example 10. The system of Example 9, wherein the service worker is idle when it is not active and when it is not waiting on an outstanding request made to the web server or content delivery network.

Example 11. The system of any of Examples 8-10, wherein the operations further comprise:
in response to a determination by the web server that the first version is not still valid:
receiving, from the web server, a newest version of the web page;
returning the newest version of the web page to the browser;
receiving, at the service worker a request from the browser for assets corresponding to the newest version of the web page;
obtaining the assets corresponding to the newest version of the web page from a content delivery network;
storing the assets corresponding to the newest version of the web page in the cache; and
returning the assets corresponding to the newest version of the web page to the browser for rendering.

Example 12. The system of any of Examples 8-11, wherein the web page contains a plurality of components, the browsing context contains a separate web worker for each component, and the call for the web page comes from one of the web workers.

Example 13. The system of Example 11, wherein the newest version of the web page from the content delivery network contains only files that were not already present in the cache by virtue of a diff operation performed by the content delivery network between the first version of the web page and the newest version of the web page.

Example 14. The system of Example 13, wherein the newest version of the web page from the content delivery network contains only files that were not already present in the cache by virtue of a differ operation performed by the content delivery network between the web page and another web page previously loaded into the cache.

Example 15. A non-transitory machine-readable medium comprising instructions which, when read by a machine, cause the machine to perform operations comprising:
  initializing, at a browsing context corresponding to a web page, a service worker, in response to a call for the web page from a browser;
  storing, in a cache at the service worker, assets corresponding to a first version of the web page;
  intercepting, at the service worker, a subsequent call for the web page from the browser;
  adding, at the service worker, a parameter including an identification of the first version, to the subsequent call;
  sending the subsequent call to a web server, the web server configured to perform a check to determine if the first version is still valid;
  in response to a determination by the web server that the first version is still valid:
    returning the first version of the web page to the browser;
    receiving, at the service worker a request from the browser for the assets corresponding to the first version of the web page; and
    returning the assets from the cache to the browser for rendering.

Example 16. The non-transitory machine-readable medium of Example 15, wherein the operations further comprise:
  when the service worker is idle, requesting a newest version of the web page from a content delivery network; and
  storing assets corresponding to the newest version of the web page in the cache.

Example 17. The non-transitory machine-readable medium of Example 16, wherein the service worker is idle when it is not active and when it is not waiting on an outstanding request made to the web server or content delivery network.

Example 18. The non-transitory machine-readable medium of any of Examples 15-17, wherein the operations further comprise:
  in response to a determination by the web server that the first version is not still valid:
  receiving, from the web server, a newest version of the web page;
  returning the newest version of the web page to the browser;
  receiving, at the service worker a request from the browser for assets corresponding to the newest version of the web page;
  obtaining the assets corresponding to the newest version of the web page from a content delivery network;
  storing the assets corresponding to the newest version of the web page in the cache; and
  returning the assets corresponding to the newest version of the web page to the browser for rendering.

Example 19. The non-transitory machine-readable medium of any of Examples 15-18, wherein the web page contains a plurality of components, the browsing context contains a separate web worker for each component, and the call for the web page comes from one of the web workers.

20. The non-transitory machine-readable medium of claim 18, wherein the newest version of the web page from the content delivery network contains only files that were not already present in the cache by virtue of a diff operation performed by the content delivery network between the first version of the web page and the newest version of the web page.

Figure 11:
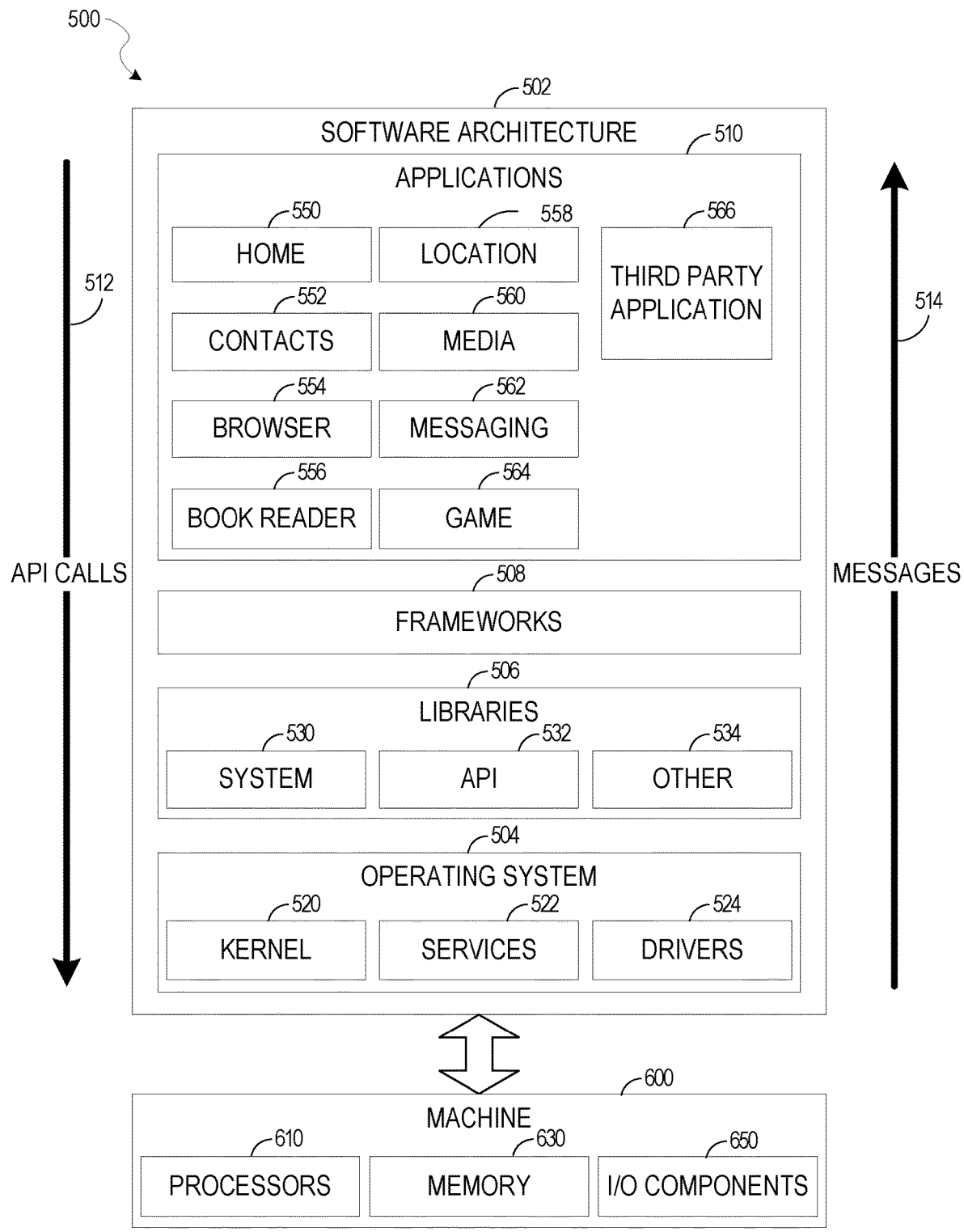
FIG. 11 is a block diagram illustrating an example software architecture, which may be used in conjunction with various hardware architectures herein described.

FIG. 11 is a block diagram 1100 illustrating an architecture of software 1102, which can be installed on any one or more of the devices described above. FIG. 11 is merely a non-limiting example of a software architecture, and it will be appreciated that many other architectures can be implemented to facilitate the functionality described herein. In various embodiments, the software 1102 is implemented by hardware such as a machine 1200 of FIG. 12 that includes processors 1210, memory 1230, and input/output (I/O) components 1250. In this example architecture, the software 1102 can be conceptualized as a stack of layers where each layer may provide a particular functionality. For example, the software 1102 includes layers such as an operating system 1104, libraries 1106, frameworks 1108, and applications 1110. Operationally, the applications 1110 invoke API calls 1112 through the software stack and receive messages 1114 in response to the API calls 1112, consistent with some embodiments.

In various implementations, the operating system 1104 manages hardware resources and provides common services. The operating system 1104 includes, for example, a kernel 1120, services 1122, and drivers 1124. The kernel 1120 acts as an abstraction layer between the hardware and the other software layers, consistent with some embodiments. For example, the kernel 1120 provides memory management, processor management (e.g., scheduling), component management, networking, and security settings, among other functionality. The services 1122 can provide other common services for the other software layers. The drivers 1124 are responsible for controlling or interfacing with the underlying hardware, according to some embodiments. For instance, the drivers 1124 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1106 provide a low-level common infrastructure utilized by the applications 1110. The libraries 1106 can include system libraries 1130 (e.g., C standard library) that can provide functions such as memory allocation functions, string manipulation functions, mathematic functions, and the like. In addition, the libraries 1106 can include API libraries 1132 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1106 can also include a wide variety of other libraries 1134 to provide many other APIs to the applications 1110.

The frameworks 1108 provide a high-level common infrastructure that can be utilized by the applications 1110, according to some embodiments. For example, the frameworks 1108 provide various GUI functions, high-level resource management, high-level location services, and so forth. The frameworks 1108 can provide a broad spectrum of other APIs that can be utilized by the applications 1110, some of which may be specific to a particular operating system or platform.

In an example embodiments, the applications 1110 include a home application 1150, a contacts application 1152, a browser application 1154, a book reader application 1156, a location application 1158, a media application 1160, a messaging application 1162, a game application 1164, and a broad assortment of other applications such as a third-party application 1166. According to some embodiments, the applications 1110 are programs that execute functions defined in the programs. Various programming languages can be employed to create one or more of the applications 1110, structured in a variety of manners, such as object-oriented programming languages (e.g., Objective-C, Java, or C++) or procedural programming languages (e.g., C or assembly language). In a specific example, the third-party application 1166 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1166 can invoke the API calls 1112 provided by the operating system 1104 to facilitate functionality described herein.

Figure 12:
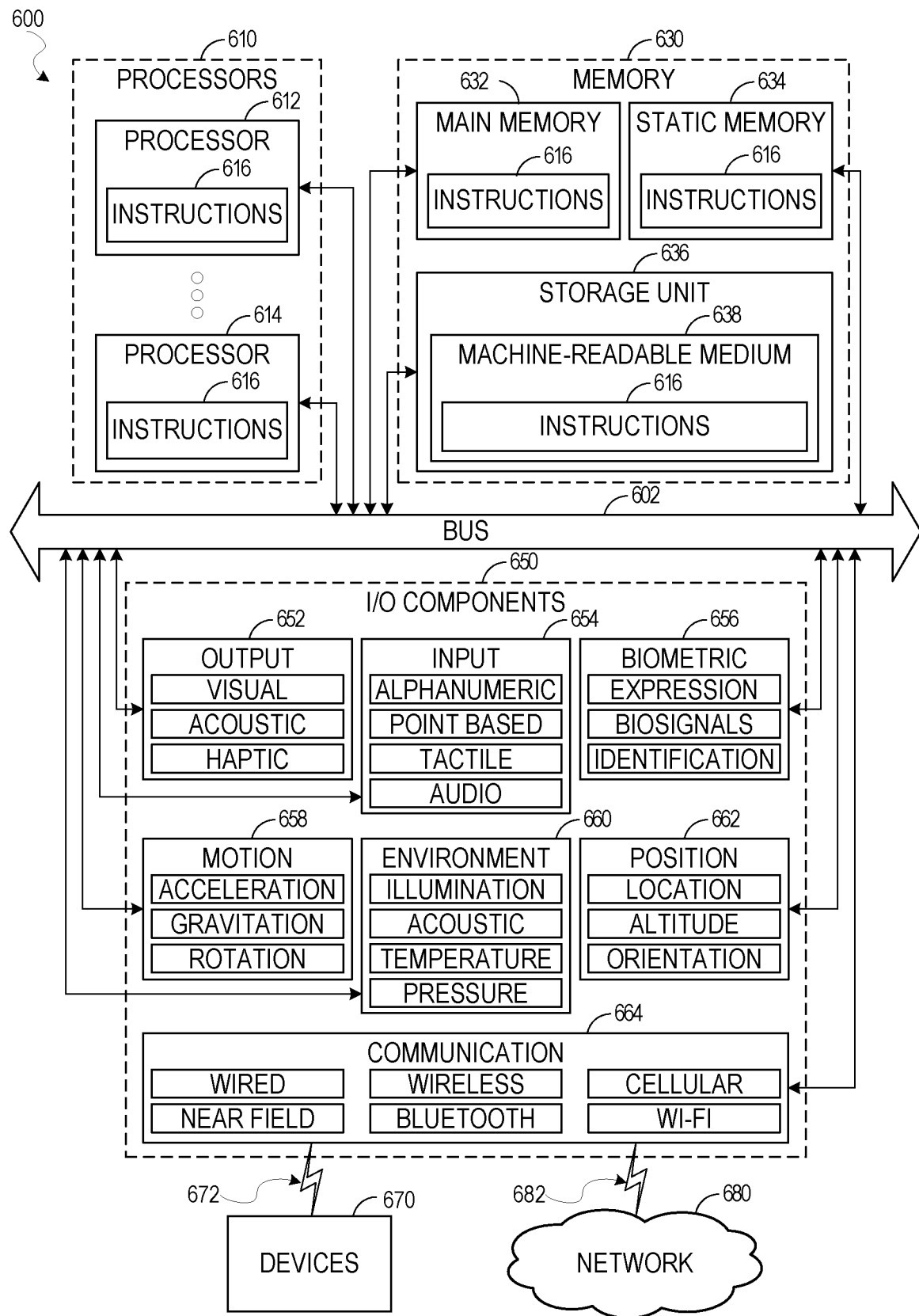
FIG. 12 is a block diagram illustrating components of a machine, according to some example embodiments, that is able to read instructions from a machine-readable medium (e.g., a machine-readable storage medium) and perform any one or more of the methodologies discussed herein.

FIG. 12 illustrates a diagrammatic representation of a machine 1200 in the form of a computer system within which a set of instructions may be executed for causing the machine to perform any one or more of the methodologies discussed herein, according to an example embodiment. Specifically, FIG. 12 shows a diagrammatic representation of the machine 1200 in the example form of a computer system, within which instructions 1216 (e.g., software, a program, an application, an applet, an app, or other executable code) for causing the machine 1200 to perform any one or more of the methodologies discussed herein may be executed. For example, the instructions 1216 may cause the machine 1200 to execute the method 400 of FIG. 4. Additionally, or alternatively, the instructions 1216 may implement FIGS. 1-4, and so forth. The instructions 1216 transform the general, non-programmed machine 1200 into a particular machine 1200 programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any one or more of the methodologies discussed herein.

The machine 1200 may include processors 1210, memory 1230, and I/O components 1250, which may be configured to communicate with each other such as via a bus 1202. In an example embodiment, the processors 1210 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1212 and a processor 1214 that may execute the instructions 1216. The term "processor" is intended to include multi-core processors that may comprise two or more independent processors (sometimes referred to as "cores") that may execute instructions contemporaneously. Although FIG. 12 shows multiple processors 1210, the machine 1200 may include a single processor with a single core, a single processor with multiple cores (e.g., a multi-core processor), multiple processors with a single core, multiple processors with multiples cores, or any combination thereof.

The memory 1230 may include a main memory 1232, a static memory 1234, and a storage unit 1236, all accessible to the processors 1210 such as via the bus 1202. The main memory 1230, the static memory 1234, and storage unit 1236 store the instructions 1216 embodying any one or more of the methodologies or functions described herein. The instructions 1216 may also reside, completely or partially, within the main memory 1232, within the static memory 1234, within the storage unit 1236, within at least one of the processors 1210 (e.g., within the processor's cache memory), or any suitable combination thereof, during execution thereof by the machine 1200.

The I/O components 1250 may include a wide variety of components to receive input, provide output, produce output, transmit information, exchange information, capture measurements, and so on. The specific I/O components 1250 that are included in a particular machine will depend on the type of machine. For example, portable machines such as mobile phones will likely include a touch input device or other such input mechanisms, while a headless server machine will likely not include such a touch input device. It will be appreciated that the I/O components 1250 may include many other components that are not shown in FIG. 12. The I/O components 1250 are grouped according to functionality merely for simplifying the following discussion and the grouping is in no way limiting. In various example embodiments, the I/O components 1250 may include output components 1252 and input components 1254. The output components 1252 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1254 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1250 may include biometric components 1256, motion components 1258, environmental components 1260, or position components 1262, among a wide array of other components. For example, the biometric components 1256 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1258 may include acceleration sensor components (e.g., accelerometer), gravitation sensor components, rotation sensor components (e.g., gyroscope), and so forth. The environmental components 1260 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1262 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1250 may include communication components 1264 operable to couple the machine 1200 to a network 1280 or devices 1270 via a coupling 1282 and a coupling 1272, respectively. For example, the communication components 1264 may include a network interface component or another suitable device to interface with the network 1280. In further examples, the communication components 1264 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1270 may be another machine or any of a wide variety of peripheral devices (e.g., a peripheral device coupled via a USB).

Moreover, the communication components 1264 may detect identifiers or include components operable to detect identifiers. For example, the communication components 1264 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1264, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 1230, 1232, 1234, and/or memory of the processor(s) 1210) and/or storage unit 1236 may store one or more sets of instructions and data structures (e.g., software) embodying or utilized by any one or more of the methodologies or functions described herein. These instructions (e.g., the instructions 1216), when executed by processor(s) 1210, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 1280 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1280 or a portion of the network 1280 may include a wireless or cellular network, and the coupling 1282 may be a Code Division Multiple Access (CDMA) connection, a Global System for Mobile communications (GSM) connection, or another type of cellular or wireless coupling. In this example, the coupling 1282 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1216 may be transmitted or received over the network 1280 using a transmission medium via a network interface device (e.g., a network interface component included in the communication components 1264) and utilizing any one of a number of well-known transfer protocols (e.g., HTTP). Similarly, the instructions 1216 may be transmitted or received using a transmission medium via the coupling 1272 (e.g., a peer-to-peer coupling) to the devices 1270. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1216 for execution by the machine 1200, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

"Non-transitory computer-readable storage medium" refers, for example, to a tangible medium that is capable of storing, encoding, or carrying the instructions for execution by a machine.

What is claimed is:

1. A method for reducing latencies when synchronizing web page data across a plurality of active browsing tabs of a single web browser operating on a single system, the method comprising:
   initializing, at a first system executing a single web browser, a single shared service worker shared by a plurality of active browsing tabs of the single web browser;
   registering, in a cache associated with the single shared service worker, a first request from a first web worker of a first active browsing tab for a web page data, the first request associated with a first version of a web page hosted by a web server;
   intercepting, at the single shared service worker, a second request from a second web worker of a second active browsing tab for the web page data;
   confirming, at the single shared service worker, that the web page was updated at the web server;
   in response to confirming that the web page data was updated, tracking, at the single shared service worker, subsequent requests for the web page data; and
   in response to identifying, at the single shared service worker, the second request, synchronizing the updated web page data with the second web worker.

2. The method of claim 1, further comprising:
   when the single shared service worker is idle, requesting a newest version of the web page data from a content delivery network; and
   storing the newest version of the web page data in the cache.

3. The method of claim 2, wherein the single shared service worker is idle when it is not active and when it is not waiting on outstanding requests made to the web server or the content delivery network.

4. The method of claim 1, further comprising:
   in response to a determination by the web server that the web page data was not updated:
      receiving, by the single shared service worker and from the web server, a newest version of the web page data;
      receiving, at the single shared service worker, a request from at least one web worker for the web page data corresponding to the newest version of the web page data;
      obtaining the web page data corresponding to the newest version of the web page from a content delivery network;
      storing the web page data corresponding to the newest version of the web page data in the cache; and
      returning the web page data corresponding to the newest version of the web page data to the browser for rendering.

5. The method of claim 4, wherein the newest version of the web page data from the content delivery network contains only files that were not already present in the cache by virtue of a differ operation performed by the content delivery network between the web page data and another web page data previously loaded into the cache.

6. A system for reducing latencies when synchronizing data at a cache of a device with data at a server, the system comprising:
   one or more processors;
   at least one memory storing instructions that, when executed by at least one processor among the one or more processors, cause at least one processor to perform operations comprising:
      initializing, at a first system executing a single web browser, a single shared service worker shared by a plurality of active browsing tabs of the single web browser;
      registering, in a cache associated with the single shared service worker, a first request from a first web worker of a first active browsing tab for a web page data, the first request associated with a first version of a web page hosted by a web server;
      intercepting, at the single shared service worker, a second request from a second web worker of a second active browsing tab for the web page data;
      confirming, at the single shared service worker, that the web page was updated at the web server;
      in response to confirming that the web page data was updated, tracking, at the single shared service worker, subsequent requests for the web page data; and
      in response to identifying, at the single shared service worker, the second request, synchronizing the updated web page data with the second web worker.

7. The system of claim 6, wherein the operations further comprise:
   when the single shared service worker is idle, requesting a newest version of the web page data from a content delivery network; and storing the newest version of the web page data in the cache.

8. The system of claim 7, wherein the single shared service worker is idle when it is not active and when it is not waiting on outstanding requests made to the web server or the content delivery network.

9. The system of claim 6, wherein the operations further comprise:
in response to a determination by the web server that the web page data was not updated:
receiving, by the single shared service worker and from the web server, a newest version of the web page data;
receiving, at the single shared service worker, a request from at least one web worker for the web page data corresponding to the newest version of the web page data;
obtaining the web page data corresponding to the newest version of the web page from a content delivery network;
storing the web page data corresponding to the newest version of the web page data in the cache; and
returning the web page data corresponding to the newest version of the web page data to the browser for rendering.

10. The system of claim 9, wherein the newest version of the web page data from the content delivery network contains only files that were not already present in the cache by virtue of a differ operation performed by the content delivery network between the web page data and another web page data previously loaded into the cache.

11. A non-transitory machine-readable medium comprising instructions which, when read by a machine, cause the machine to perform operations comprising:
initializing, at a first system executing a single web browser, a single shared service worker shared by a plurality of active browsing tabs of the single web browser;
registering, in a cache associated with the single shared service worker, a first request from a first web worker of a first active browsing tab for a web page data, the first request associated with a first version of a web page hosted by a web server;
intercepting, at the single shared service worker, a second request from a second web worker of a second active browsing tab for the web page data;
confirming, at the single shared service worker, that the web page was updated at the web server;
in response to confirming that the web page data was updated, tracking, at the single shared service worker, subsequent requests for the web page data; and
in response to identifying, at the single shared service worker, the second request, synchronizing the updated web page data with the second web worker.

12. The non-transitory machine-readable medium of claim 11, wherein the operations further comprise:
when the single shared service worker is idle, requesting a newest version of the web page data from a content delivery network; and
storing the newest version of the web page data in the cache.

13. The non-transitory machine-readable medium of claim 12, wherein the single shared service worker is idle when it is not active and when it is not waiting on outstanding requests made to the web server or the content delivery network.

14. The non-transitory machine-readable medium of claim 11, wherein the operations further comprise:
in response to a determination by the web server that the web page data was not updated:
receiving, by the single shared service worker and from the web server, a newest version of the web page data;
receiving, at the single shared service worker, a request from at least one web worker for the web page data corresponding to the newest version of the web page data;
obtaining the web page data corresponding to the newest version of the web page from a content delivery network;
storing the web page data corresponding to the newest version of the web page data in the cache; and
returning the web page data corresponding to the newest version of the web page data to the browser for rendering.

15. The non-transitory machine-readable medium of claim 14, wherein the newest version of the web page data from the content delivery network contains only files that were not already present in the cache by virtue of a diff operation performed by the content delivery network between the first version of the web page data and the newest version of the web page data.

* * * * *